United States Patent [19]

Mitterbacher

[11] Patent Number: 4,541,990
[45] Date of Patent: Sep. 17, 1985

[54] VESSEL

[75] Inventor: Paul Mitterbacher, Gallneukirchen, Austria

[73] Assignee: Voest-Alpine Aktiengesellschaft, Austria

[21] Appl. No.: 556,564

[22] Filed: Nov. 30, 1983

[30] Foreign Application Priority Data

Dec. 2, 1982 [AT] Austria ................................ 4380/82

[51] Int. Cl.⁴ ............................................. B01J 19/02
[52] U.S. Cl. .................................... 422/242; 422/241
[58] Field of Search ............... 422/189, 193, 194, 232, 422/233, 241, 242

[56] References Cited

U.S. PATENT DOCUMENTS

| | | | |
|---|---|---|---|
| 2,181,153 | 11/1939 | Prickett | 422/241 |
| 3,172,832 | 3/1965 | Dreyer et al. | 208/47 |
| 3,235,344 | 2/1966 | Dreyer et al. | 422/242 |

FOREIGN PATENT DOCUMENTS

| | | |
|---|---|---|
| 1230953 | 12/1966 | Fed. Rep. of Germany . |
| 1258003 | 1/1968 | Fed. Rep. of Germany . |
| 2503511 | 8/1976 | Fed. Rep. of Germany . |

Primary Examiner—John Adee
Attorney, Agent, or Firm—Burns, Doane, Swecker & Mathis

[57] ABSTRACT

A vessel includes an outer wall and an inner wall arranged at a distance therefrom within the vessel and leaving an annular space relative to the outer wall. The inner wall is supported on the outer wall so as to allow for relative movements. In order to provide a vessel with which the danger of oscillations of the inner wall is avoided, with which a simple supply of medium is possible, which is easy to clean and with which the danger of an implosion of the inner wall is reduced, the inner wall is comprised of individual annular sections subsequently arranged in an axial direction of the vessel. Each section is supported on the outer wall independently of the other sections. An expansion joint is provided between two neighboring annular sections each.

16 Claims, 5 Drawing Figures

VESSEL

The present invention relates to a vessel, in particular a pressure vessel for hydration or cracking plants, comprising an outer wall, optionally provided with an inner lining, and an inner wall arranged at a distance therefrom within the vessel and leaving an annular space relative to the outer wall, the inner wall being supported on the outer wall so as to allow for relative movements.

Vessels with inner walls (also called liners) are used, for instance for hydration and cracking plants, being under a high pressure (about 300 bars) in such plants and having process temperatures of about 500° C. in their interiors. By providing an inner wall, a temperature decrease of the pressure-bearing outer wall is achieved due to the formation of a stationary medium layer in the annular space between the outer wall and the inner wall. Furthermore, the outer wall is protected by the inner wall against depositions (such as, for instance, petrol coke or cracked tar, as they form during hydration) and in case of local damage to the isolating layer.

It is known to design the inner walls in one part and inherently rigid and to support or fasten them on one point only, for instance on one end of the vessel, so that the inner wall may expand freely to the opposite end of the vessel. This mode of construction has the disadvantage that a relatively large expansion gap must be present between the movable end of the inner wall and the pertaining end of the vessel. Furthermore, the known inner wall cannot be supported laterally on account of the radial thermal expansion, thus risking an oscillation of the inner wall.

A further problem arises, if one attempts to introduce a medium into the vessel between the vessel ends. For, one is then forced to either lead also through the inner wall pipe sockets laid laterally through the pressure-bearing outer wall, with the pipe sockets being guided through longholes of the inner wall extending in the axial direction of the vessel, in order to enable an axial expansion of the inner wall relative to the outer wall, or to introduce pipes into the vessel by departing from a bottom of the pressure vessel, which pipes project into the vessel in the axial direction as far as to the site at which the medium is to be supplied. If this site is, for instance, in the center of the vessel, one is forced to arrange very long pipes within the vessel, which is disadvantageous when cleaning the vessel and calls for special measures to support these long pipes. In case of laterally introduced pipe sockets, depositions at and behind the longholes of the inner wall, which are penetrated by the pipe sockets, will be caused.

A further problem of known inner walls in pressure vessels will arise if the pressure vessel is shut down extremely quickly or at a sudden, for instance, in case of a failure. As a consequence, there is the danger of implosions of the inner wall.

The invention aims at avoiding these disadvantages and difficulties and has as its object to provide a vessel of the initially defined kind, with which the danger of oscillations of the inner wall is avoided, with which a simple supply of medium is possible, which is easy to clean and with which the danger of an implosion of the inner wall is reduced.

This object is achieved according to the invention in that the inner wall is comprised of individual annular sections subsequently arranged in an axial direction of the vessel, each section being supported on the outer wall independently of the other sections and an expansion joint being provided between two neighboring annular sections each.

With a vessel having a cylindrical vessel part, the inner wall in the cylindrical vessel part suitably is comprised of neighboring cylindrical courses constituting the sections, each cylindrical course being movably supported on the outer wall by means of at least three guides radially extending from the axis of the vessel.

According to a preferred embodiment, the inner wall comprises frustoconical or spherical-segment-shaped courses neighboring the vessel bottoms of the vessel, which, with their ends having the larger diameters, are each directed to the cylindrical courses and, with their ends having the smaller diameters, are each directed to the vessel bottoms.

Therein, a frustoconical or spherical-segment-shaped course suitably is supported on the vessel bottom by means of supports extending in the direction of the axis of the vessel at about half the height of the course or thereabove, measured from the end having the smaller diameter. By the support at half height or thereabove, the frustoconical courses may freely expand axially in both directions, the radial expansion of the frustoconical courses being enabled by a slight bow of the guides extending in the axial direction.

A particularly simple installation of the inner wall is feasible if the courses are formed by parts neighboring in the peripheral direction, which are connected by seams extending in the longitudinal direction of the vessel. Thereby it is possible to introduce the parts of the courses through the manhole into the vessel; a vessel lid extending over the total cross section of the vessel may be omitted.

Suitably, the guides are formed by pipings penetrating the outer wall, into which project, or which project into, pipe sockets mounted on the courses and penetrating these courses, with play, whereby one structural part, i.e., the guide, assumes three functions: it serves to support and to center the courses and, in addition, to supply medium. The pipe sockets penetrating the courses may be sealed relative to the inner wall and need not project beyond the inner wall. Thereby it is possible to achieve a smooth inner wall surface, which is responsible for an undisturbed flow in the interior of the vessel and which permits an easy and simple cleaning of the inner space. Furthermore, depositions in the annular space provided between the inner wall and the outer wall are prevented.

According to a preferred embodiment, the courses on that end which is more closely neighboring to the vessel bottom draining the medium are each provided with a radially inwardly offset step ring reaching beyond the neighboring course in the direction of the vessel axis, whereby flows in the annular space between the inner wall and the pressure-bearing outer wall are reliably prevented and the courses are also guided at each other.

Preferably, neighboring courses are connected by means of flexible sieve rings bridging the expansion joints, whereby the penetration of solids into the annular space is effectively prevented, while displacements between the courses due to thermal expansions are not impeded.

Furthermore, it is suitable if supports projecting towards the courses are fastened to the outer wall, surrounding the courses with a radial play. The supports constitute auxiliary slide surfaces so that the sliding of metallic parts on the outer wall, or on an insulating layer optionally provided thereon is prevented.

The invention will now be explained in more detail by way of the drawings, wherein.

Figure 3:
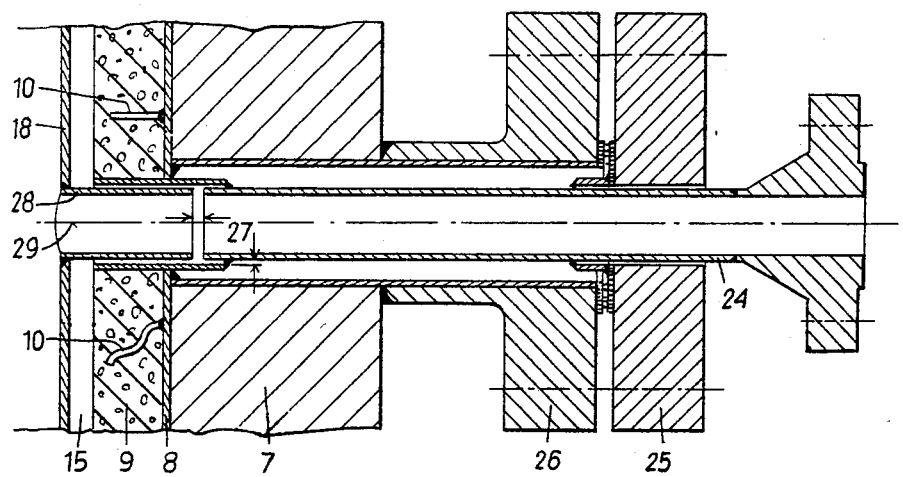

A pressure vessel 1 of a reactor for hydration comprises a cylindrical central part 2 and two semi-spherical bottoms 3, 4 closing the cylindrical central part 2 on both sides. To the semi-spherical bottoms are each connected a product entrance duct and a product exit duct 5, 6. The pressure vessel 1 comprises a pressure-bearing outer wall 7 of steel, which is provided with a plating 8 of stainless steel on its inner side. To the plating, an insulation of concrete 9 is applied. Anchoring pins 10 (FIG. 3) care for a good connection of the insulation 9 to the pressure-bearing outer wall 7. A vessel foot 11 fastened to the pressure vessel is supported on the base 12.

In the inner space 13 of the pressure vessel 1, which is designed for an operation temperature of about 480° C. and an operation pressure of about 325 bars, an inner wall 16 is provided at a distance 14 from the outer wall 7, which leaves an annular space 15 relative to the outer wall 7 and also is made of stainless steel. This inner wall 16 is manufactured of courses 17, 18, 19 constituting individual sections, each course being mounted on the pressure-bearing outer wall independently of the neighboring courses. Between the courses 17, 18, 19 expansion joints 20 are provided so that the courses 17, 18, 19 will not contact each other. Thereby, a free expansion of each course, independently of the other neighboring courses, is guaranteed.

Figure 1:
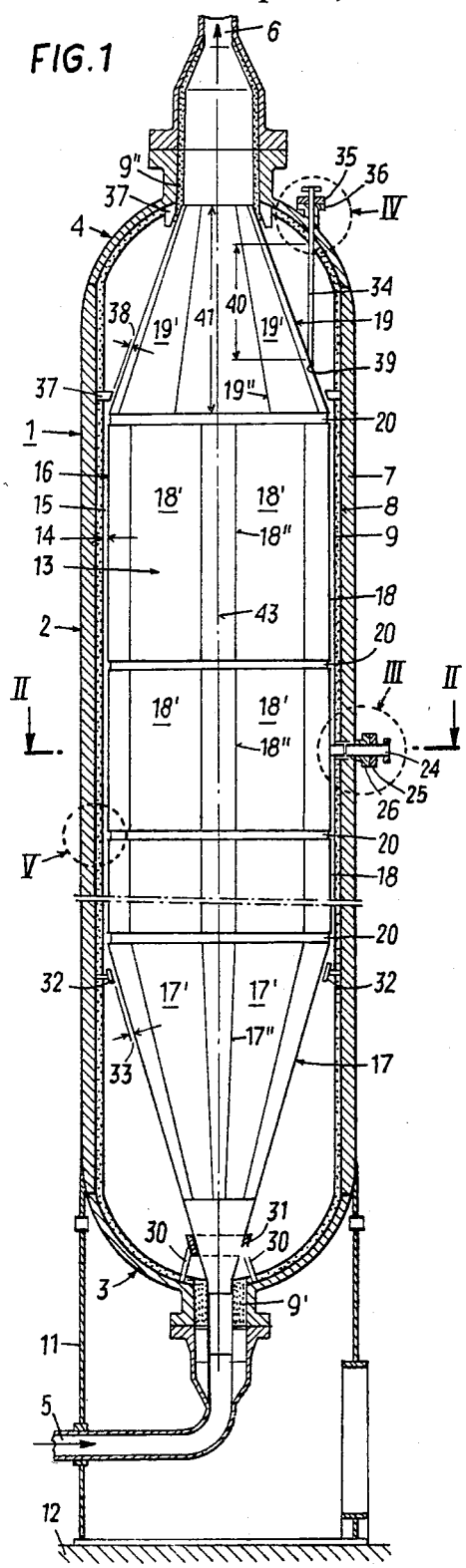
FIG. 1 illustrates a longitudinal section led through the axis of a pressure vessel.

As can be seen from FIG. 1, the inner wall 16 is comprised of frustoconical courses 17, 19 neighboring the vessel bottoms 3, 4 and forming the ends of the inner wall, and of cylindrical courses 18 arranged between them.

The frustoconical courses 17, 19—which might be designed also as spherical-segment-shaped courses—are each directed, with their ends having the larger diameter, to the cylindrical courses 18 and, with their ends having the smaller diameter, to the pressure vessel bottoms 3, 4, whereby a conical transition part from the product entrance and exit ducts 5, 6 to the cylindrical courses 18 is each formed.

Figure 5:
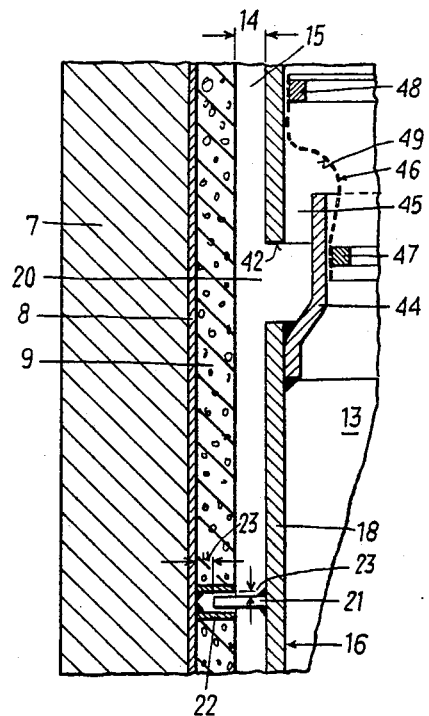
FIGS. 3, 4 and 5 show the details III, IV, V of FIG. 1 on an enlarged scale.
Figure 2:
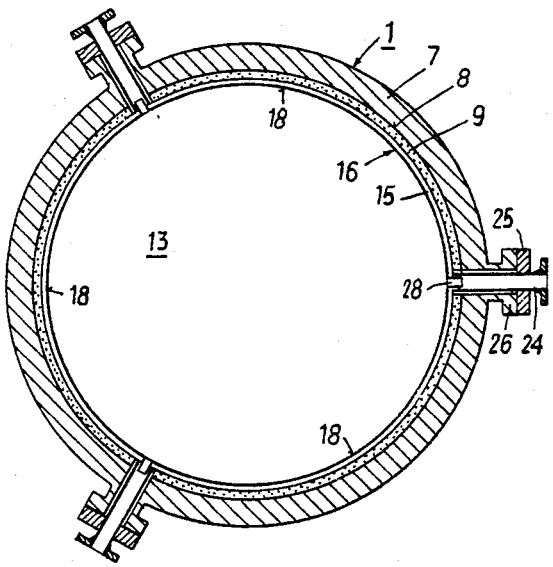
FIG. 2 illustrates a section according to line II—II of FIG. 1.

The cylindrical courses 18 are supported on the outer wall 7 by means of radial guides. The radial guides are formed by pins 21 extending radially outwardly from the respective course 18 and being inserted in tube-shaped sleeves 22 fastened to the pressure-bearing outer wall 7, with radial and axial play 23 (cf. FIG. 5). To safely support the courses, three guides 21, 22 offset by 120° are provided for each course.

If it is required to supply an additional medium to the inner space 13 of the vessel 1 at the height of a course, the radial guides are each formed by a piping 24 penetrating the pressure-bearing outer wall 7 and fastened to the pressure-bearing outer wall by means of two flanges 25, 26, one flange 25 of which is connected with the piping 24 and one flange 26 is connected with the outer wall 7. A pipe socket 28 fastened to a course 18 of the inner wall 16 is alignedly inserted in this piping 24 with radial and axial play 27, the socket 28 thus being mounted in the piping 24 so as to be displaceable in the direction of its axis 29.

The frustoconical courses 17, 19 may be supported on the pressure-bearing outer wall 7 in different ways. The lower frustoconical course 17 arranged on the run-in side is supported by means of supporting brackets 30, fastened to the pressure-bearing outer wall 7 and to a ring 31 provided on the outer side of this frustoconical course 17. On the end having the larger diameter, this course 17 is carried by means of T-shaped supporting pins 32, which are also fastened to the pressure-bearing outer wall 7, with the T-shaped pins, however, comprising a play 33 relative to the course 17, so that the course 17 may freely expand and contract.

Figure 4:
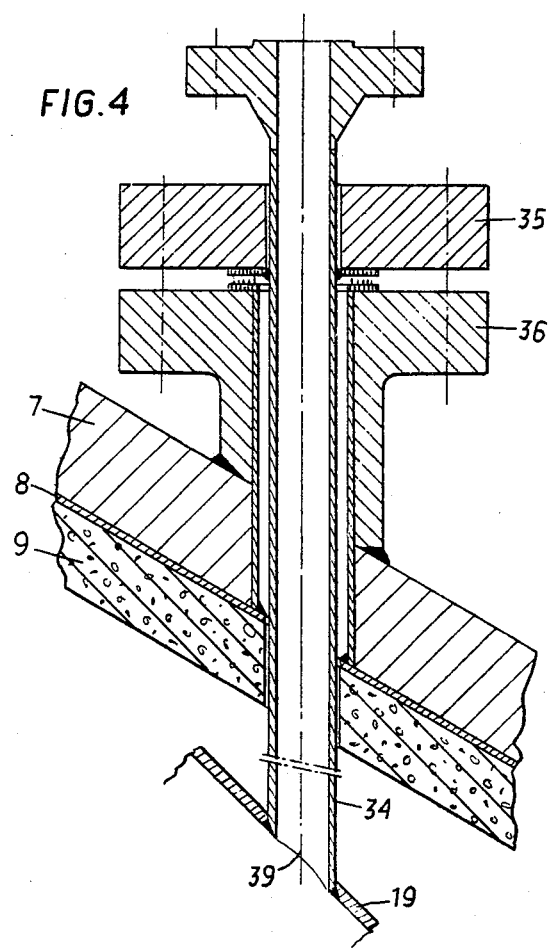

The run-out side frustoconical course 19 is supported on the pressure-bearing outer wall 7 by three fastening means extending in the axial direction of the vessel, which fastening means are designed as medium supply conduits 34 (one being illustrated in FIG. 1). As is apparent from FIG. 4, the conduit 34, which is rigidly connected with the frustoconical course 19, penetrates the pressure-bearing outer wall 7 and is rigidly connected with the pressure-bearing outer wall 7 by means of two flanges 35, 36, one of which is connected with the conduit 34 and one is connected with the outer wall 7. On account of these conduits 34, this frustoconical course 19 is fixed in its position relative to the pressure-bearing outer wall. The ends of the course 19, however, are supported so as to be movable relative to the outer wall of the vessel in the axial and radial directions, i.e., by means of centering supports 37 fastened to the pressure-bearing outer wall 7 and supporting the frustoconical course 19 on several spots of its periphery. These centering supports, in the radial direction, comprise a play 38 relative to the frustoconical course 19 so that the course 19 may expand in the radial direction. Such expansions lead to a bending of the conduits 34 to which the course 19 is fastened.

Since the respective mouths 39 of the conduits 34 entering into the frustoconical course 19 are located at a great distance 40 from the course end facing the penetration site of the conduit—in the exemplary embodiment illustrated the mouths 39 of the conduits 34 are located at a distance of more than half the height 41 of the frustoconical course 19 from the upper end of the course 19—, these bendings of the conduits 34, which are caused by the thermal expansions occurring in the radial direction, can be readily accommodated by the same.

The run-in-side frustoconical course 17, with its run-in-side end, overlaps the product entrance duct 5 with a slight play and projects into an insulation body 9' arranged on the run-in side.

The run-out side frustoconical course 19, with its run-out-side end, overlaps the insulation 9" provided on the end of the pressure vessel, so that the annular space between the courses of the inner wall and the pressure-bearing outer wall is exempt from flows.

In order to prevent the penetration of depositions into the annular space 15 between the courses 17, 18, 19 of the inner wall 16 and the pressure-bearing outer wall 7, the courses, on their ends directed towards the product exit duct 6, each comprise radially inwardly offset step rings 44 reaching beyond the rim 42 of the neighboring course 17, 18, 19 in the direction of the axis 43 of the pressure vessel 1, which step rings keep the annular space 15 present between the courses 17, 18, 19 of the inner wall 16 and the pressure-bearing outer wall 7 exempt from flows. The radial step is so large that the neighboring courses 17, 18, 19 do not impede each other in their axial expansions, despite the step rings 44. The step rings 44 realize the guidance of the courses 17, 18, 19 on each other. The gap 45 each provided between the step ring 44 and the neighboring course 18, 19 may be bridged by a curved sieve ring 46. This sieve ring 46 is clamped by means of clamping rings 47, 48 to the step ring 44, on the one hand, and to the neighboring course 18, 19, on the other hand. Due to its curvature 49, the sieve ring 46 allows for relative movements of the courses 17, 18, 19, both axially and radially.

For the purpose of an easy mounting of the courses 17, 18, 19 of the inner wall 16, the courses are formed by parts 17', 18', 19' neighboring in the peripheral direction and connected by welding seams 17", 18", 19" extending in the longitudinal direction of the vessel. Thereby it is possible to introduce parts of the courses through the manhole of the vessel into its interior 13 and to weld them within the vessel, so that a vessel lid extending over the total cross section of the pressure vessel 1 may be eliminated.

The invention is not limited to the embodiment illustrated. The inner wall according to the invention may be provided for pressure vessels of various modes of construction, i.e., not only for solid-web vessels, but also for multi-layer vessels. The pressure vessel according to the invention may be utilized for various chemical plants in which chemical reactions take place at high temperatures and at high pressures. Furthermore, the inner wall of the invention can be provided also for storage tanks for the storage of media of high temperatures.

What I claim is:

1. In a vessel, such as a pressure vessel to be used in hydration or cracking plants, of the type including an outer wall, an inner wall arranged at a distance from said outer wall within said vessel and leaving an annular space relative to said outer wall, said inner wall being supported on said outer wall so as to allow for relative movements, the improvement of the inner wall comprising individual annular sections sequentially arranged in an axial direction of said vessel, means for supporting each of said annular sections on said outer wall, independently of the remaining ones of said annular sections, and an expansion joint bridging neighboring annular sections.

2. The vessel as set forth in claim 1, wherein said outer wall is provided with a lining.

3. The vessel as set forth in claim 1, wherein said outer wall includes a cylindrical part, said inner wall within said cylindrical part comprising neighboring cylindrical courses constituting said annular sections and at least three guides provided for each cylindrical course and radially extending from the axis of said vessel and adapted to movably support each of said cylindrical courses on said outer wall.

4. The vessel as set forth in claim 3, wherein said outer wall includes a bottom part and said inner wall in said bottom part comprises frustoconical or spherical-segment-shaped courses, each of said frustoconical or spherical-segment-shaped courses having a larger-diameter end directed toward said cylindrical courses and a smaller-diameter end directed toward said bottom part.

5. The vessel as set forth in claim 4, wherein said vessel further comprises supports extending in the direction of the vessel axis and adapted to support a frustoconical or spherical-segment-shaped course on said bottom part.

6. The vessel as set forth in claim 5, wherein said frustoconical or spherical-segment-shaped course is supported at about half its height, measured from said smaller-diameter end.

7. The vessel as set forth in claim 5, wherein said frustoconical or spherical-segment-shaped course is supported above half its height, measured from said smaller-diameter end.

8. The vessel as set forth in claim 3, wherein said cylindrical courses comprise parts neighboring in the peripheral direction and being connected by seams extending parallel with the axial direction of said vessel.

9. The vessel as set forth in claim 3, wherein said guides are formed by pipings penetrating said outer wall, and which further comprises pipe sockets mounted to said courses so as to penetrate said courses and projecting into said piping with play.

10. The vessel as set forth in claim 3, wherein said guides are formed by pipings penetrating said outer wall, and which further comprises pipe sockets mounted to said courses so as to penetrate said courses, said pipings projecting into said pipe sockets with play.

11. The vessel as set forth in claim 3, wherein said vessel includes a medium-draining bottom and each of said courses, on its end positioned toward said medium-draining bottom, being provided with a radially inwardly offset step ring extending into the neighboring course in the direction of the axis of said vessel.

12. The vessel as set forth in claim 3, wherein said expansion joints include flexible sieve rings bridging said neighboring courses.

13. The vessel as set forth in claim 4, further comprising course-surrounding supports fastened to said outer wall so as to project towards said courses and surrounding said courses with radial play.

14. The vessel of claim 1, wherein said annular sections are axially apart from each other.

15. A vessel, such as a pressure vessel to be used in hydration of cracking plants, said vessel having a cylindrical part including an outer wall, an inner wall arranged at a distance from said outer wall within said vessel and leaving an annular space relative to said outer wall, said inner wall comprising coaxially aligned, individual cylindrical courses, an annular expansion joint sealingly extending between adjacent cylindrical courses, and means for supporting each cylindrical course on said outer wall independently of the other annular sections, so to permit independent radial and axial expansion of each cylindrical course, said means for supporting each cylindrical course comprising a plurality of guide members extending radially outward from said cylindrical course and sleeve members secured to said outer wall, said sleeve members being sized and positioned relative to said guide members so as to receive said guide members with radial and axial play.

16. The vessel of claim 15, wherein said cylindrical courses are axially apart from each other.

* * * * *